United States Patent
Künz et al.

(10) Patent No.: US 12,030,234 B2
(45) Date of Patent: Jul. 9, 2024

(54) METHOD FOR TRANSFERRING A NEGATIVE STRUCTURE OF A SURFACE OF AN INNER WALL OF A BLOW MOLDING TOOL, AND PLASTIC CONTAINER

(71) Applicant: ALPLA Werke Alwin Lehner GmbH & Co. KG, Hard (AT)

(72) Inventors: Johann Künz, Hard (AT); Thomas Bohle, Alberschwende (AT)

(73) Assignee: ALPLA Werke Alwin Lehner GmbH & Co. KG, Hard (AT)

( * ) Notice: Subject to any disclaimer, the term of this patent is extended or adjusted under 35 U.S.C. 154(b) by 146 days.

(21) Appl. No.: 17/599,774

(22) PCT Filed: Mar. 27, 2020

(86) PCT No.: PCT/EP2020/058666
§ 371 (c)(1),
(2) Date: Sep. 29, 2021

(87) PCT Pub. No.: WO2020/201063
PCT Pub. Date: Oct. 8, 2020

(65) Prior Publication Data
US 2022/0152910 A1 May 19, 2022

(30) Foreign Application Priority Data
Mar. 29, 2019 (CH) ........................ 413/19

(51) Int. Cl.
*B29C 49/48* (2006.01)
*B29C 49/30* (2006.01)
(Continued)

(52) U.S. Cl.
CPC .......... *B29C 49/4823* (2013.01); *B29C 49/30* (2013.01); *B29C 49/64* (2013.01);
(Continued)

(58) Field of Classification Search
CPC ..... B29C 49/4823; B29C 49/64; B29C 49/30; B29C 49/48; B29C 2049/4876;
(Continued)

(56) References Cited

U.S. PATENT DOCUMENTS

| 4,206,171 A | 6/1980 | Uhlig |
| 5,041,247 A | 8/1991 | Kim |

(Continued)

FOREIGN PATENT DOCUMENTS

| CN | 1148827 A | 4/1997 |
| CN | 107257726 A | 10/2017 |

(Continued)

OTHER PUBLICATIONS

International Search Report Corresponding to PCT/EP2020/058664 mailed Jun. 5, 2020.

(Continued)

*Primary Examiner* — Monica A Huson
(74) *Attorney, Agent, or Firm* — Finch & Maloney PLLC

(57) ABSTRACT

A method for transferring a negative structure of a surface of an inner wall (51) of a blow molding tool (1) onto a surface of a plastic container. The method comprises the steps of heating at least one region (511) of a mold cavity (6) of a molding body (4) of the blow molding tool (1), on which the negative structure is formed, inserting a preform into the mold cavity (6), closing the blow molding tool (1), molding the plastic container by inflating the preform and bringing the preform to lie against the inner wall (51) of the mold cavity (6), cooling the region (511) by supplying a coolant through temperature control channels (54), and removing the plastic container from the mold.

19 Claims, 3 Drawing Sheets

Figure 1:
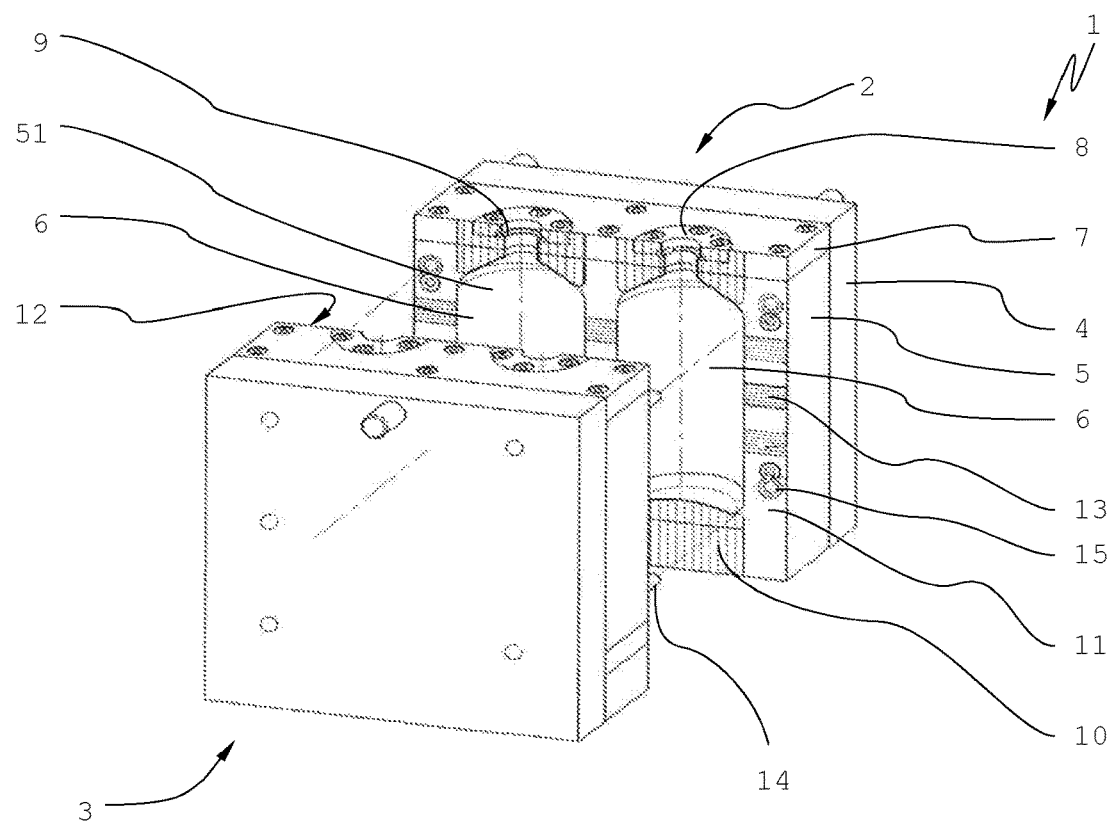

(51) Int. Cl.
*B29C 49/64* (2006.01)
*B29C 49/04* (2006.01)
*B29K 23/00* (2006.01)
*B29L 31/00* (2006.01)

(52) U.S. Cl.
CPC ...... *B29C 49/04* (2013.01); *B29C 2049/4825* (2013.01); *B29C 2049/483* (2013.01); *B29C 2049/4838* (2013.01); *B29C 2049/4846* (2013.01); *B29C 2049/4851* (2013.01); *B29C 2049/4876* (2013.01); *B29C 2049/4879* (2013.01); *B29K 2023/00* (2013.01); *B29K 2023/12* (2013.01); *B29K 2871/00* (2013.01); *B29K 2905/02* (2013.01); *B29K 2905/12* (2013.01); *B29K 2995/0015* (2013.01); *B29K 2995/003* (2013.01); *B29L 2031/712* (2013.01); *B29L 2031/7158* (2013.01)

(58) Field of Classification Search
CPC .... B29C 2049/4879; B29C 2049/4838; B29C 2049/4851; B29C 2049/4825; B29C 49/04; B29C 2049/4846; B29C 2049/483; B29C 49/06; B29C 2949/0715; B29K 2905/02; B29K 2023/12; B29K 2067/003; B29K 2995/0015; B29K 2905/12; B29K 2871/00; B29K 2995/003; B29K 2023/00; B29L 2031/7158; B29L 2031/712; Y02P 70/10

See application file for complete search history.

(56) References Cited

U.S. PATENT DOCUMENTS

| | | | |
|---|---|---|---|
| 7,758,801 B2 | 7/2010 | Künz | |
| 9,296,147 B2 | 3/2016 | Le Pechour et al. | |
| 2006/0051451 A1* | 3/2006 | Hutchinson | B29C 33/046 425/552 |
| 2010/0252963 A1 | 10/2010 | Scharf et al. | |
| 2011/0298162 A1 | 12/2011 | Chomel et al. | |
| 2014/0053609 A1 | 2/2014 | Bennett | |
| 2015/0151480 A1 | 6/2015 | Brunner et al. | |
| 2016/0375624 A1 | 12/2016 | Culeron et al. | |
| 2018/0079128 A1 | 3/2018 | Rapet et al. | |
| 2018/0162037 A1 | 6/2018 | Chomel | |

FOREIGN PATENT DOCUMENTS

| | | |
|---|---|---|
| DE | 33 01 337 A1 | 7/1984 |
| DE | 10 2010 020 090 A1 | 11/2011 |
| EP | 2 208 606 A2 | 7/2010 |
| EP | 2 703 146 A1 | 3/2014 |
| FR | 2 982 789 A1 | 5/2013 |
| GB | 1 480 647 | 7/1977 |
| GB | 2 239 626 A | 7/1991 |
| JP | H07-40426 A | 2/1995 |
| JP | H07-108534 A | 4/1995 |
| WO | 96/30190 A1 | 10/1996 |
| WO | 9933634 A1 | 7/1999 |
| WO | 00/27612 A1 | 5/2000 |
| WO | 2006/000329 A1 | 1/2006 |
| WO | 2017/005561 A1 | 1/2017 |

OTHER PUBLICATIONS

Written Opinion Corresponding to PCT/EP2020/058664 mailed Jun. 5, 2020.
International Search Report Corresponding to PCT/EP2020/058665 mailed Jun. 8, 2020.
Written Opinion Corresponding to PCT/EP2020/058665 mailed Jun. 8, 2020.
International Search Report Corresponding to PCT/EP2020/058666 mailed Jun. 9, 2020 (Previously Submitted).
Written Opinion Corresponding to PCT/EP2020/058666 mailed Jun. 9, 2020 (Previously Submitted).
Indian Office Action Corresponding to 202117041378 mailed Sep. 1, 2023.
Indian Office Action Corresponding to 202117041364 mailed Jul. 7, 2023.
Office Action Corresponding to 2020800251643 mailed Jul. 20, 2023.
Chinese Office Action Corresponding to 202080025161X mailed Aug. 7, 2023.
Chinese Office Action Corresponding to 202080025162.4 mailed Aug. 5, 2023.

* cited by examiner

METHOD FOR TRANSFERRING A NEGATIVE STRUCTURE OF A SURFACE OF AN INNER WALL OF A BLOW MOLDING TOOL, AND PLASTIC CONTAINER

The invention relates to a method for transferring a negative structure of a surface of an inner wall of a blow molding tool, in particular of an extrusion blow-molding tool, to a surface of a plastic container, and to a plastic container made of a polyolefin and produced according to such a method.

Single-layer or multilayer plastic containers, for example made of polyolefins, are often produced in an extrusion blow-molding method, in particular in a parison-based blow-molding method. In this case, an extrusion head is usually used to continuously extrude a plastic parison which can be formed in one or more layers. The plastic parison is introduced in sections into a mold cavity of a blow molding tool, brought into the desired shape by means of a blowing medium introduced at overpressure, cooled, and demolded. The blow molding tool usually consists of two blow mold halves, in each of which one half of the mold cavity is formed. The blow mold halves are periodically opened, closed, and opened again in order to introduce a parison section into the mold cavity and, after inflation, to demold the finished container again.

A further, very frequently used production method for plastic containers is stretch blow-molding. In this method, a so-called preform, which mostly has an elongated tubular shape, a bottom at its one longitudinal end, and at the other longitudinal end a neck region with shaped fastening elements for a closure cap, for example threaded sections, is inserted into a mold cavity of a blow molding tool and brought into the desired shape by a blowing medium introduced at overpressure. In this case, the preform is additionally stretched in the axial direction with a stretching mandrel inserted through the neck opening. After the stretching/blowing process, the finished plastic container is cooled and demolded from the blow molding tool.

The single-layer or multilayer preform is typically produced in a separate injection-molding method prior to the stretch blow-molding process. It has also already been proposed to produce preforms in a plastic compression-molding method or by an extrusion blow-molding process. Polyethylene terephthalate (PET) and similar materials, such as polyethylene furanoate (PEF), or polyolefins, such as polypropylene (PP), high-density polyethylene (HDPE), or low-density polyethylene (LDPE), are used predominantly as raw material for the production of plastic containers in the stretch blow-molding process. In the so-called single-stage stretch blow-molding process, the preform is inserted into the mold cavity of the blow molding tool immediately after its production and inflated and stretched to form a plastic container. However, the plastic containers are often produced in a two-stage method. In this case, the preforms are produced in a first step and temporarily stored for later use. During the subsequent stretch blow-molding process, the preforms are first heated again, introduced into the mold cavity of a blow molding tool, stretched in the longitudinal direction with a stretching mandrel, and usually inflated by overpressure to form a plastic container conforming to the mold cavity. In this way, both processes—injection molding and stretch blow-molding—can be run separately and optimally.

Also normally used in the stretch blow-molding process is a blow molding tool which consists of two blow mold halves in each of which a part of the mold cavity is formed. The blow mold halves are periodically opened, closed, and opened again in order to insert, inflate, and stretch the preform and to demold the finished plastic container.

The extruded parison and also the preform are uniformly referred to as preforms in their respective methods.

In order that the preform does not suffer any temperature shock during insertion into the mold cavity of the blow molding tool, which could lead to a regional freezing of the plastic material and hinder further optimum shaping in the blow molding process, the shaping inner surfaces, i.e., in particular the inner walls of the mold cavities, of the blow molding tool when the preform is being inserted, should have a temperature that does not substantially differ from the temperature of the parison. That is to say, the temperatures of the inner surfaces of the blow molding tool preferably deviate by no more than roughly 10% from the temperature of the preform at the time when the preform is being inserted. Polyolefins are typically used at a temperature of 180° C. with a deviation of up to 20° K; polyethylene terephthalate is typically used at temperatures of 240° C. to 280° C. with a deviation of up to 20° K. On the other hand, before demolding the produced plastic container, the blow molding tool must be cooled down at the end of the blow-molding process to the point that the polymerization process of the plastic material is largely completed and no undesired deformations can occur during further processing of the plastic container.

Polyolefins are typically demolded at about 60° C., whereby the temperature at the neck is still about 80° C., and polyethylene terephthalate is typically demolded at about 30° C., whereby the neck and bottom regions can have a higher temperature of roughly 60° C. This results in a correspondingly high temperature difference during the blow molding process.

Blow molding tools are usually constructed in a plurality of parts and are mostly made of aluminum or steel or even of non-ferrous metals. The two blow mold halves of a blow molding tool each comprise a molding body, in which at least one mold cavity is formed. The molding body is mounted on a baseplate made of steel, which is a component of the closing unit of the blow molding machine. On account of the pressures occurring during the blow molding process, the baseplates and the molding bodies must be relatively solid. Known from the injection-molding process are molding tools that are very similar in construction but have a significantly more solid design in order to withstand the pressures occurring during injection molding, which are many times higher than in blow molding methods.

Considering the relatively good thermal conduction properties of the individual components in blow molding tools, it is immediately apparent that the expenditure on the periodic heating and cooling of the blow molding tools must be very high in order to achieve reasonably acceptable cycle times and be able to produce high-quality products at the same time. It is known that the blow molding tool can be heated or cooled by means of a suitable fluid, for example water, which is circulated under pressure in channels, milled grooves, and holes in the blow molding tool. In order to achieve the shortest possible cycle times, the heating/cooling fluid is conducted through the channels, milled grooves, and holes at a relatively high pressure. So that the blow molding tool withstands these high pressures, it must be all the more solid. However, in conjunction with the good thermal conduction properties of the materials used for the blow molding tool, this results in an even higher expenditure on the periodic heating and cooling of the blow molding tool. In addition, the more solid design of the blow molding tool also increases the expenditure required for the periodic opening and closing of the blow mold halves.

Due to the lack of economic viability, heating the molds to the preferred temperatures described herein has so far been dispensed with. The expenditure on dissipating the introduced heat again is enormous and requires a very high cooling capacity. In addition, this prolongs the cycle time since it is necessary to hold demolding until the entire temperature difference has been eliminated. It was thereby accepted that the finished surfaces of the containers produced may have defects due to the excessive temperature difference, and/or a negative structure, which is applied to the surface of the inner wall of the mold cavity, are transferred to the plastic containers only with a relatively high deviation and whereby, in particular, the transfer of structures smaller than 500 μm was dispensed with. In many cases, such containers are provided with a shrunk-on outer packaging so that these defects remain concealed.

It is therefore an object of the invention to overcome at least one or more disadvantages of the prior art. In particular, a method is to be provided by means of which it is possible to transfer negative structures of a surface of an inner wall of a blow molding tool to the plastic container with a very small deviation and accordingly high dimensional accuracy.

This object is achieved by the methods and devices defined in the independent claims. Further embodiments result from the dependent claims.

A method according to the invention for transferring a negative structure of a surface of an inner wall of a blow molding tool, in particular of an extrusion blow-molding tool, to a surface of a plastic container comprises the steps of:
heating at least one region of a mold cavity of a molding body of the blow molding tool on which the negative structure is formed,
introducing a preform into the mold cavity,
closing the blow molding tool,
shaping the plastic container by inflating the preform and abutting the preform against the inner wall of the mold cavity,
cooling the region by supplying a coolant through the temperature control channels,
demolding the plastic container.

The region is preferably heated by feeding a heating medium into the temperature control channels.

The heating medium and the cooling medium may be identical, but they have different temperatures according to their purpose. Correspondingly, reference is made generally to a temperature control medium.

The present method enables the targeted temperature control of a region of the inflated plastic container which substantially corresponds to the heated region of the mold cavity, wherein a specific temperature profile may be run in this region.

As a result of the heating, the preform introduced into the mold cavity flows well into the existing negative structures of a surface of an inner wall of the blow molding tool during the shaping of the plastic container as a result of the inflation of the preform and/or conforms to the corresponding surface and thus to the corresponding structure.

Subsequent cooling promotes rapid and thus precise-fitting solidification of the plastic container and thus a correspondingly good reproduction of the negative structure on the plastic container.

The heating and subsequent cooling to the desired temperatures enables the precise transfer of structures from the mold cavity to the surface of the inflated plastic container.

The structures may be both structured surfaces and polished surfaces. In other words, the present method makes it possible to transfer a structure from the mold cavity to the surface of the container with a deviation of less than 15%, preferably less than 10%, particularly preferably less than 5%, in comparison to the negative structure.

Polished surfaces are surfaces which have been processed, for example, by means of polishes and a small amount of material was removed in order to smooth a corresponding surface by removing roughness peaks and, if appropriate, to create gloss at this surface. Surfaces with an average roughness value from 0.8 μm are typically referred to as polished surfaces.

The glossiness of surfaces is expressed by means of reflectometers in so-called gloss units (GU). Reference is made herein to gloss when glossiness exceeds 10 GUs. The measurement is carried out according to ISO 2813. For completely or partially transparent objects, no reflectometer is used, but the reflectance, i.e., the quotient of reflected to irradiated light, is indicated for a specific angle. In the case of completely or partially transparent plastics, reference is made to gloss when reflectance exceeds 20%.

The method according to the invention makes it possible to achieve such glossy surfaces even with plastics, such as polyolefins, for which it is otherwise not possible, as is known, to achieve such glossy surfaces without additional working steps, such as a multilayer design of the container or preform, in which the outermost layer, which is supposed to give rise to gloss, has low viscosity and contains different additives in order to achieve the low viscosity. With a corresponding design of the surfaces of the region, plastic containers having surfaces structured at least in subregions can also be produced. With a corresponding design of the surfaces of the inner wall of the blow molding tool, even containers can thus be produced with surfaces that are glossy in subregions of the region and that are structured in other subregions of the region.

The term "structured" here means that the surface of the container substantially corresponds to the negative of the molding body, wherein the deviation between the negative and the subsequent surface does not exceed 15%, preferably 10%, particularly preferably 5%.

It goes without saying that when referring to the mold cavity in a blow mold half, only the part of the mold cavity that is located in the respective blow mold half is meant. The entire mold cavity is provided only by joining the blow mold halves (or parts if the blow molding tool is of more than two parts). The mold cavity corresponds substantially to the negative of the subsequent plastic container.

If reference is made to the inner wall of the blow molding tool, this will be the inner wall of the mold cavity.

It can be provided that the region comprises the entire mold cavity.

This makes it possible to form a desired surface on the entire container body of the plastic container.

It can be provided that during the shaping of plastic containers consisting substantially of polyolefins, the region is heated to at least 100° C., preferably to at least 130° C., in particular to at least 150° C., and preferably to 170° C.

The higher the temperature to which the region is heated, the better the preform flows into the corresponding negative structures of the surface of the inner wall of the mold cavity during inflation. Correspondingly, contour fidelity between the negative structure and the plastic container increases. The reproducibility of the negative structure is thus increased.

At a temperature of 100° C., a relatively good contour fidelity is already achieved without the need to substantially extend the cycle time. The higher the temperature selected, the more likely it is that more time is required for heating and cooling.

The region can be cooled during cooling at an average cooling rate of at least 5 K/s, preferably of 15 K/s, in particular of 30 K/s, until a demolding temperature of 60° C. is reached for plastic containers consisting substantially of polyolefins.

This promotes rapid and thus precise solidification of the plastic container in regions that are in contact with the region of the inner wall of the mold cavity.

The preform can substantially consist of a polyolefin, wherein the heating medium is supplied at a temperature of 120° C. to 200° C., preferably 160° C., and the coolant is supplied at a temperature of 5° C. to 40° C., preferably 15° C.

It has been found that these process parameters have a positive influence in particular on the provision of the corresponding temperature control medium since these temperatures can be achieved relatively cost-effectively.

It can be provided that the region is thermally insulated from the molding body and/or from a baseplate.

The mass of the region to be heated or cooled is thus at least partially thermally decoupled from further elements, such as baseplate and/or molding body. This reduces the heat transfer between the individual elements and thus reduces the mass to be cooled or heated. This reduces energy expenditure on the one hand and makes it possible on the other hand to cool or heat the region more rapidly with the same energy expenditure. With the same cycle time, a much higher temperature difference between the demolding temperature and the inflation temperature can thus be achieved. In other words, the region can be heated to a higher level without losses in terms of cycle times.

In other words, when the region comprises the entire mold cavity, substantially the entire molding body is thermally insulated, in particular with an insulation block, from the baseplate on which the molding body is arranged.

However, if the region only takes the form of a subregion of the inner wall of the mold cavity, it can be provided that only this region will be thermally insulated at least partially with an insulating element from the remaining molding body and at most additionally from the baseplate. With the same cycle time, this embodiment also enables higher temperature differences between the demolding temperature and the inflation temperature. In other words, the region can be heated to a higher level without losses in terms of cycle times.

The region can have an associated section in the molding body, wherein the region has in its associated section of the molding body separate temperature control channels for controlling the temperature of the region.

By definition, an associated section is understood to mean a subregion of the molding body which faces away from the inner wall and is arranged in the molding body behind the region.

The provision of separate temperature control channels enables targeted temperature control, i.e., heating or cooling, of the region of the inner wall.

If the region is designed as a subregion of the inner wall, this makes it possible, on the one hand, to control the temperature of this region independently of the remaining molding body. On the other hand, by forming the region as a separately temperature-controlled subregion, it is smaller in relation to the mold cavity and thus has a lower mass. This enables the very rapid heating or the very rapid cooling of this region.

It goes without saying that a plurality of regions is also possible which each comprise separate temperature control channels in their associated section of the molding body.

This enables independent temperature control of a plurality of subregions of a mold cavity. In this case, a corresponding temperature profile of a first region can be run differently from the temperature profile of a second subregion, both temporally and with regard to temperature.

Alternatively, it is also possible to provide a plurality of regions which each comprise separate temperature control channels in their associated section of the molding body, wherein these one or more regions do however comprise a common temperature control circuit, which is however independent of the remaining molding body.

This ensures that the plurality of regions have a common temperature profile.

If the region comprises the entire mold cavity and is correspondingly thermally insulated with an insulating element from the base body, the separate formation of temperature control channels likewise enables rapid heating and cooling since the mold cavity or the molding body can substantially be designed as a shell.

As already explained, the mass to be heated or cooled again is significantly reduced, and heating or cooling is substantially reduced to only the region and its associated section. As a result, a very much lower energy expenditure is required for heating or cooling the region. Due to the lower mass, the heating and cooling of the molding body can be accomplished in a relatively short time and/or a higher temperature difference can be achieved with the cycle time remaining the same. In particular, heating or cooling at a rate of 5 K/s, preferably 15 K/s, and particularly preferably 30 K/s or more, is made possible.

It is pointed out that when referring to the entire mold cavity, the part of the mold cavity that is assigned to an individual part of the blow molding tool, for example a blow mold half, is meant in each case.

Reference is made below to the embodiment in which an insulating element, for example an insulation block, made of a thermally insulating material is arranged between the molding body and the baseplate of the blow mold half.

The total mass of the blow molding tool can be limited to what is absolutely necessary for absorbing the forces occurring during the production process of the plastic container. Typically it is essentially composed of the baseplate, the insulation block, and the molding body for each blow mold half.

The decrease in the total mass of the blow molding tool also has an advantageous effect on the energy costs for the movement of the blow mold halves for opening and closing the same.

It can be provided that the molding body is embedded in the insulation block. As a result, the molding body is thermally insulated over a substantial portion of the extent of the at least one mold cavity. Embedding of the molding body prevents the formation of thermal bridges or at least reduces it. The dimensions of the molding body and of the insulation block can be selected in such a way that when a headplate or a foot part is used for producing the container neck or the container bottom, they are also thermally insulated from the baseplates of the blow mold halves and possible thermal bridges are prevented.

It can be provided that the insulation block is embedded in a molding block. The molding block consists of the baseplate, a bottom, two laterally arranged frame parts, and a neck insert. The frame parts are equipped with guides.

Such a design results in the reduction of individual parts. The production of the blow molding tool is simplified.

It can alternatively be provided that the molding block and the insulation block are formed in one piece.

In other words, each molding tool half is formed only in two parts and is composed of an insulation block which assumes all the functions of the baseplate and of the frame, such as holding and guiding, and a molding body. The manufacture of the blow molding tool is thus simplified.

The molding body of each blow mold half preferably has a rear side, which is in particular embedded in the insulation block and which is provided with channels, in particular channels that are open on one side, for the throughflow of a heating medium/coolant. The heating medium/coolant flows in the closest possible proximity to the shaping inner wall delimiting the mold cavity. As a result, in particular when cooling the molding body, the heat of the container wall abutting against the shaping inner wall can be dissipated very well. In contrast to, for example, injection molding, the heat can only be dissipated on one side via the cooled shaping inner wall of the molding body during blow molding. It is therefore recommended to keep the distance of the heating medium/coolant from the shaping inner wall as short as possible.

The channels can be closed by embedding the molding body in the insulation block so that a cooling circuit is produced. Prior to embedding, these channels are therefore open and accessible at one end.

The formation of such channels on the molding body makes it possible to form the channels freely in the mold, for example, wherein, in particular, curved shapes are possible or flow cross-sections that deviate from a round shape. Such designs are not possible, for example, in conventional molding bodies since no change in direction is possible in cooling holes.

The rear side of the molding body preferably has ribs, between which, in particular by which, the channels are formed. The ribs are preferably arranged alternately and extend from a first longitudinal side of the mold, on which the parting plane is formed, in the direction of a second longitudinal side of the mold but only to the extent that an opening is formed between the rib and the respective second longitudinal side, said opening having a cross-section corresponding to the cross-section of the channels. In this way, a contiguous meandering channel that extends across the rear wall of the molding body is formed.

The ribs have a minimum wall thickness of 3 mm and do not exceed a wall thickness of preferably 8 mm.

When the heating medium/coolant is introduced, the heat can be supplied very quickly to the mold half or dissipated therefrom by these ribs.

By arranging the molding body at or on the insulation block, a closed cooling or heating circuit is preferably formed which is sealed off from its surroundings and only has devices for supplying and discharging the heating medium/coolant.

The heating/cooling channels, in particular the heating/cooling circuit, are thus preferably bounded by the insulation block on the one hand and by the molding body on the other hand.

In this case, it can additionally be provided that corresponding ribs and/or channels are arranged in the insulation block so that the ribs and channels of the molding body are each arranged on the ribs and channels of the insulation block and together form a heating/cooling cross-section.

The cross-sections of the heating/cooling cross-sections can be adapted easily. With a given cross-section, it is also possible to produce the respective ribs on the molding body and on the insulation block at half the height in each case. This facilitates manufacture.

The insulation block expediently serves not only to thermally insulate the molding body from the baseplate. The insulation block can be equipped with channels and/or holes for the supply and discharge of a heating medium/coolant to the channels formed on the rear side of the molding body. It may be provided that all connections for the supply and discharge of hot and cold media are provided on the insulation block.

The connections then have no thermal contact with, for example, the baseplate or other components of the tool.

Reference is made below to the embodiment in which the region is formed as a subregion of the inner wall, in particular the embodiment in which the region with its associated section is formed on a molding part separately formed from the molding body.

On the one hand, this enables the separate manufacture of the associated section and the temperature control channels contained therein; on the other hand, separate formation makes possible or simplifies a formation of the surface of the region different from the surface of the remaining inner wall.

Maintenance of the blow molding tool is also simplified. It is to be expected that as a result of rapidly changing temperature profiles, the region and the associated section of the molding tool are loaded more than the remaining blow molding tool and this region with its associated section shows wear correspondingly earlier. Separate formation makes it possible to replace this worn region by replacing the molding part and to restore the blow molding tool.

The molding part may be made of aluminum or an alloy thereof. Aluminum has a lower coefficient of thermal expansion in comparison to steel. As a result, stresses, caused by thermal expansion, in an aluminum molding part arranged in a molding body made of steel are reduced in comparison to a combination of steel and steel.

If an insulating element is provided, it can be arranged between the molding part and the molding body. Depending on the design of the molding part, the insulating element can also be referred to as an insulating block.

The mass to be heated or cooled of the region and its associated section is thus at least partially thermally decoupled from the remaining molding body. This reduces the heat transfer from the molding part to the molding body and thus reduces the mass to be cooled or heated. This reduces the energy expenditure on the one hand and makes it possible on the other hand to cool or heat the region more rapidly with the same energy expenditure.

For supplying the temperature control channels, a distributor block can be arranged between the baseplate and the molding body.

A distributor block makes it possible to selectively supply a temperature control medium, i.e., a heating or cooling medium, to the temperature control channels. A replacement element can also be created by means of a distributor block, which makes it possible, by simple swapping of the distributor block, to supply a plurality of temperature control channels in a collective manner, i.e. together, or alternatively also to supply one or more regions with a temperature control medium separately.

The distributor block can have connections for the supply and discharge of a heating/cooling medium, i.e., a temperature control medium, to the temperature control channels.

By arranging the connections on the distributor block, said connections can be easily maintained. Production is also facilitated since a distributor block typically has an extension up to the outer regions of the blow molding tool and the connections are correspondingly easily accessible.

In this case, it can be provided that a plurality of connections for supplying a plurality of temperature control channels are arranged on the distributor block and are each formed separately. This makes it possible to supply different temperature control channels separately. By replacing the distributor block, it is possible to quickly and easily insert a distributor block that has only a single set of connections and that connects all existing temperature control channels to one another so that they can be supplied simultaneously.

The temperature control channels may take the form of a hole. Here, a concentrically arranged tube is preferably arranged within the hole so that an annular gap forms as a temperature control channel between the tube and the hole.

Thus, for example, the temperature control medium can be introduced into the associated section of the region through the annular gap and can be brought out again through the tube, or introduced through the tube and brought out again through the annular gap. The manufacture of the temperature control channels in this manner is simple, cost-effective, and fast. When a tube fails, it can easily be replaced.

The following statements relate to all embodiments.

It can be provided that the insulating element consists of a thermosetting, high-temperature-resistant plastic with a low thermal conductivity.

This makes a long service life possible and prevents unwanted heat flows.

These plastics are distinguished by their very low thermal conductivity, which is only 0.1-0.8 W/mK depending on the type of plastic. For use in conjunction with blow molding tools according to the invention, plastics from the group consisting of polyaryl ether ketones, such as polyether ether ketone (PEEK), polyamides, glass-fiber-reinforced plastics, and reinforced thermosets with a temperature resistance of up to at least 200° C. are in particular preferred. The plastic can in particular be a hard plastic or a hard plastic composite material. Plastics that have a hardness of at least 75 Shore are herein considered to be hard plastics.

This makes manufacture with a precise fit possible and also prevents deformations caused by high pressures during operation.

The molding body can be formed in a plurality of parts and comprise a neck insert and/or a bottom part. The molding body can correspondingly comprise a middle part.

This simplifies the manufacture and also the maintenance of the blow molding tool. It is thus possible, for example, to form the entire neck insert and/or the bottom part and/or the middle part as a region that comprises separate temperature control channels. Preferably, however, at least in one component of the molding body, i.e., for example, in the neck insert and/or the bottom part, preferably in the middle part, a region with an associated section that comprises separate temperature control channels is formed.

The baseplate may be made of stainless steel. The steel design ensures that the baseplate can absorb the forces that occur. The property whereby the steel is stainless prevents premature corrosion of the baseplate.

The molding body may be made of aluminum or an alloy thereof.

Since aluminum has a relatively low coefficient of thermal expansion, a high dimensional stability of the blow molding tool over a broad temperature range is made possible.

A wall thickness between the temperature control channel and the region is at least 1.5 mm and at most 12 mm. The region is part of the surface of the inner wall; in other words, a material thickness between the blown shape and the temperature control medium is 1.5 mm to 12 mm.

This dimensioning guarantees on the one hand a minimum strength caused by the minimum wall thickness and on the other hand a thermal resistivity that is limited by the maximum dimension of this remaining wall thickness. The temperature of the region can be controlled correspondingly dynamically.

The region may have a uniformly structured surface as negative structure. Alternatively, it is also conceivable for the region to have a glossy surface as a negative structure. In addition, it can be provided that the region has both uniform structures and glossy subregions.

The structured surface may be designed as a reflection grating that has a grating constant of less than 10 µm. This structured surface is transferred to the surface of the plastic container by the aforementioned method steps with a deviation of less than 1 µm, in particular of less than 0.5 µm, preferably of less than 0.1 µm.

This makes it possible to provide a corresponding reflection grating on the finished blown plastic container. This provision makes it possible to attach holograms to the plastic containers, which make it possible, for example, to place therein information relating to quality assurance and/or tracking, wherein this information can be read, for example, by optical devices. Furthermore, a high-quality surface appealing to the customer can be created.

A further aspect of the invention relates to a plastic container made of a polyolefin, in particular polypropylene, which is preferably produced according to a method as described herein. The container has a surface that is structured at least in one region. The structure of the surface differs from the negative structure of the blow mold corresponding to the container by less than 1 µm, in particular less than 0.5 µm, preferably less than 0.1 µm, preferably less than 0.01 µm.

The corresponding deviation is determined as follows:

An outwardly offset image, which is outwardly offset by the predetermined deviation, of the structure of the surface of the container is generated. A corresponding inwardly offset image of the structure of the surface is likewise generated. This results in an envelope curve around the structure of the surface whose boundaries correspond to twice the distance of the predefined deviation. In order for the structure of the surface of the plastic container to meet the criteria with respect to the deviation, the negative structure of the blow molding tool must be encompassed by this envelope curve. It should be noted that, for example, finished blown containers can exhibit shrinkage overall. In other words, the finished blown and cooled container may have shrinkage with respect to the mold cavity with which this container was produced. This shrinkage is taken into account when checking the aforementioned quality parameter; in other words, the container is scaled to its original size.

The structured surface of the plastic container can be designed as a reflection grating, wherein the grating constant is preferably less than 10 µm, preferably less than 5 µm, in particular less than 1 µm.

As a result, the plastic container has a high-quality interface that is appealing to the customer. In addition, it is made possible for different information to be placed within a reflection grating, which in turn makes it possible to track the product and/or to prove a corresponding authenticity.

Exemplary embodiments of a blow molding tool are explained in more detail below with reference to schematic figures.

Figure 2:
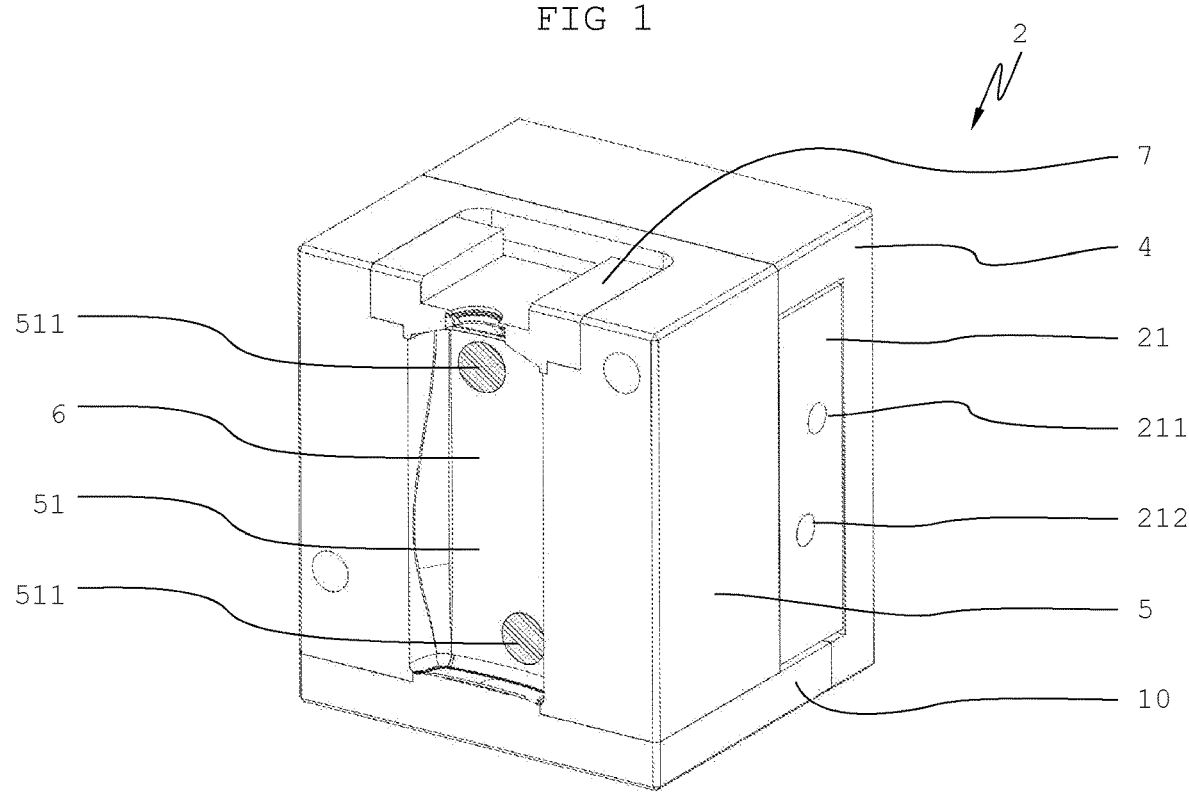
Figure 3:
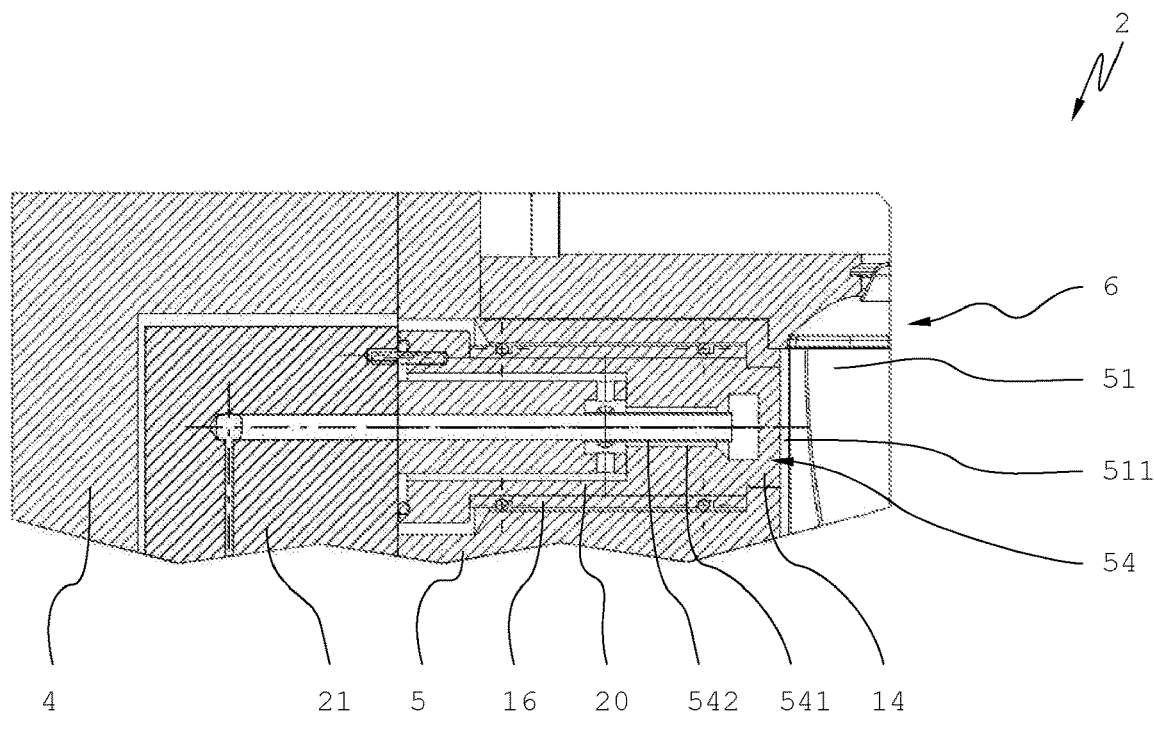
Figure 4:
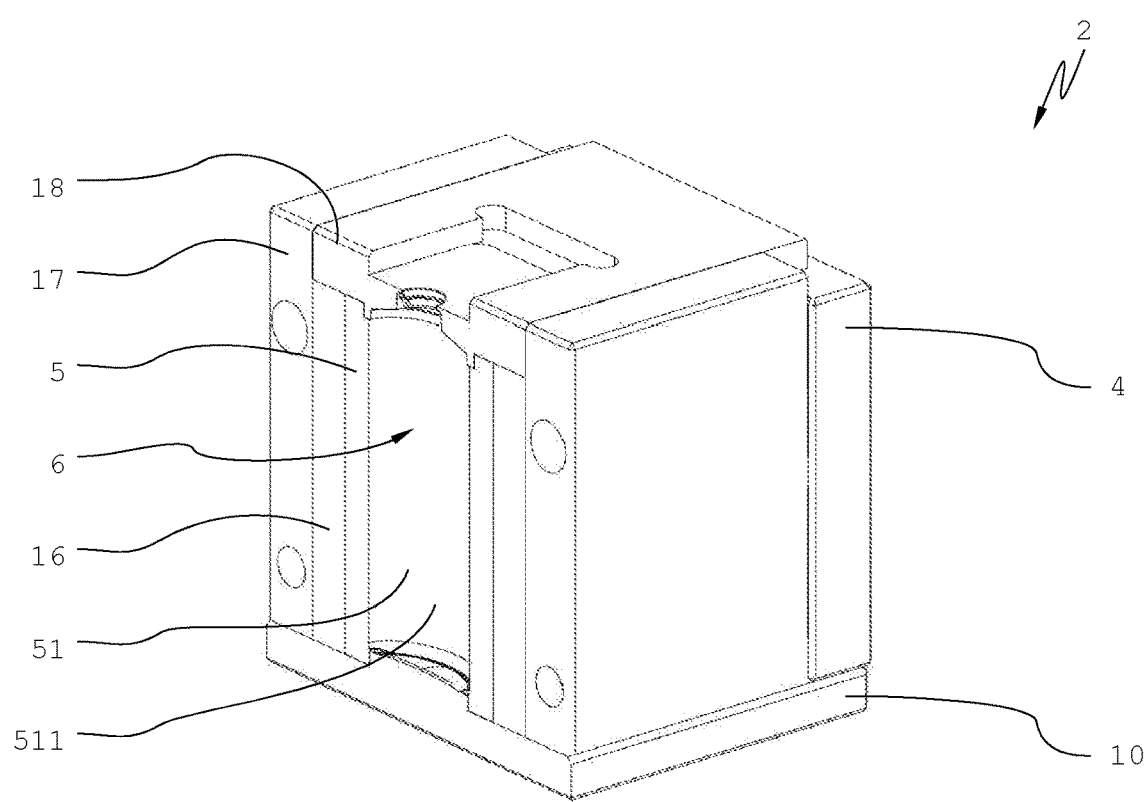
Figure 5:
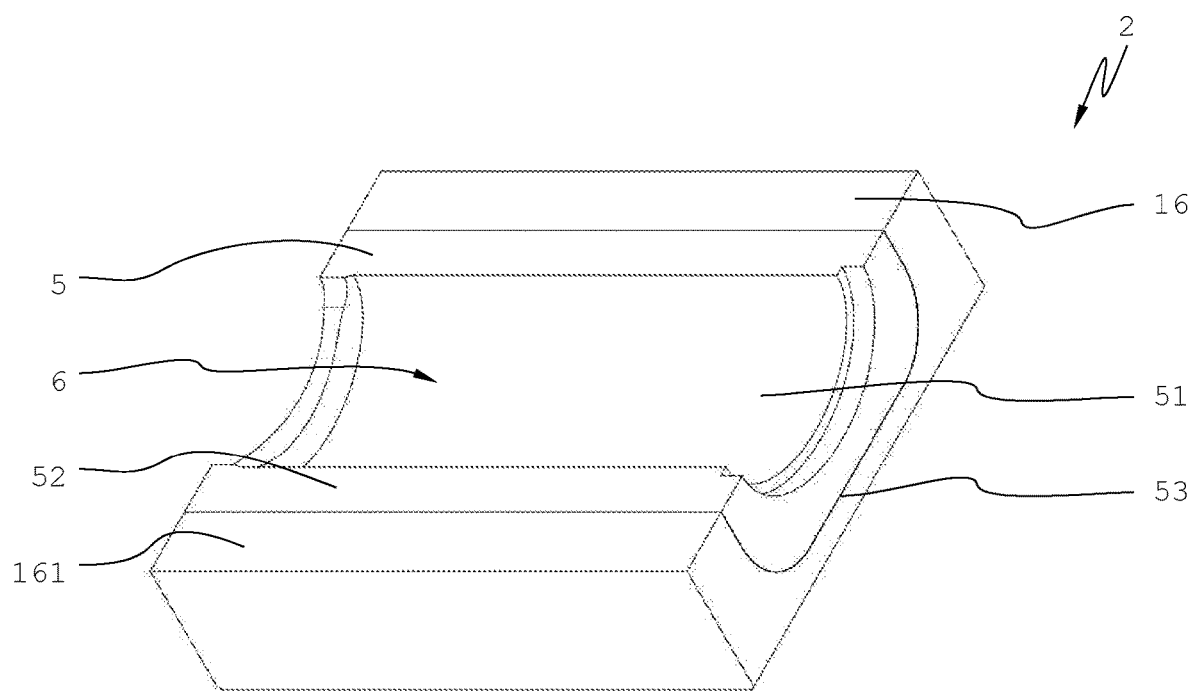
Figure 6:
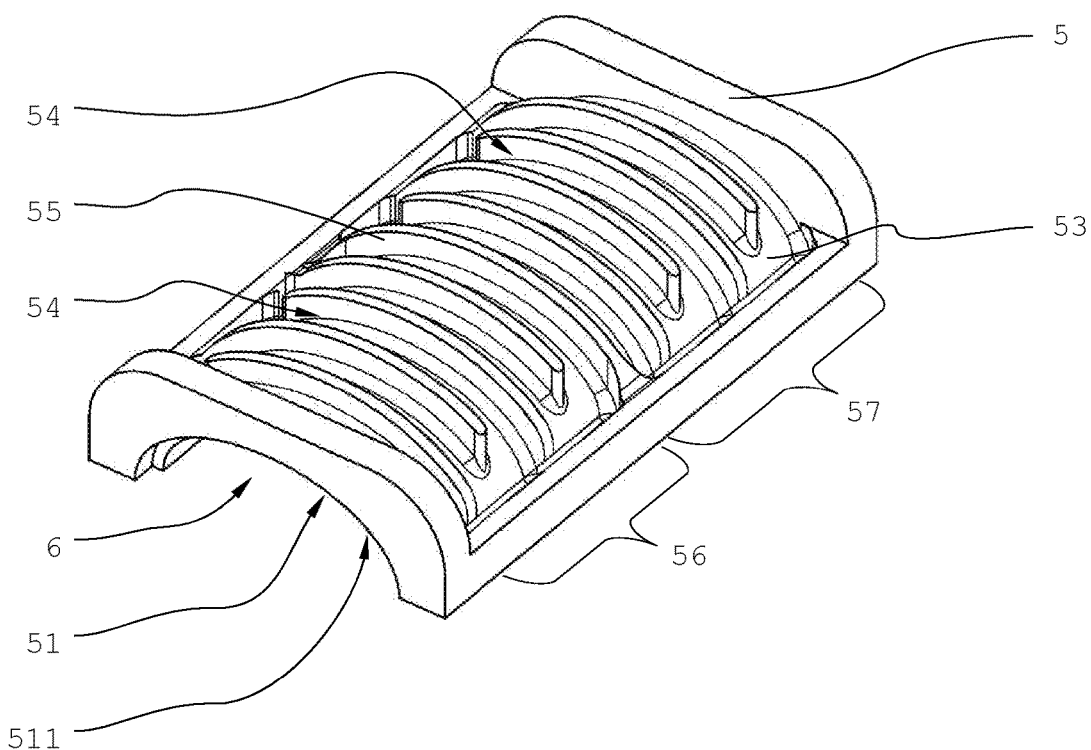

These show:

FIG. 1: a prior-art blow molding tool having two blow mold halves;

FIG. 2: a first blow mold half;

FIG. 3: a vertical sectional view of FIG. 2;

FIG. 4: a second blow mold half;

FIG. 5: a perspective view of the molding body of the blow mold half from FIG. 4; and FIG. 6: a perspective view of the rear side of the molding body from FIG. 5.

FIG. 1 shows a blow molding tool 1 from the prior art for explaining the basic structure of such a tool. The blow molding tool, which as a whole is provided with reference sign 1, comprises a first blow mold half 2 and a second blow mold half 3. In the present case, said blow mold halves are laterally displaceable relative to one another in order to open and close the blow molding tool 1 periodically. Each blow mold half 2, 3 comprises a baseplate 4, which forms part of a closing unit of a blow molding machine. Mounted on the baseplate 4 is a molding body 5 in which one or more mold cavities 6 are formed. According to the exemplary embodiment shown, the molding body 5 has two mold cavities 6, each defining one half of the shape of a body of a plastic container. Since the mold cavities correspond to one another, the two mold cavities are, for better clarity, not provided with all reference signs, although the explanations apply in each case to both mold cavities.

A head plate 7 is provided with a cavity 8 for defining a neck section of the plastic container. In the case of a blow molding tool for an extrusion blow-molding machine, a neck blade 9 for separating an extruded plastic parison inserted into the blow molding tool 1 can also be provided on the headplate 7. A bottom part 10 closes the mold cavities 6 at the other end of the blow molding tool 1. On the mutually facing surfaces 11, 12 of the blow mold halves 2, 3, which define a separating plane of the blow molding tool 1, venting slots 13 can be formed. On one of the blow mold halves 3, guide pins 14 are formed, which slide into guide bushes 15 of the other blow mold half 2 when the blow mold halves 2, 3 are closed. The molding body 5 has a wall surface, i.e., an inner wall 51, which forms a part of the mold cavity 6.

FIG. 2 shows a first blow mold half 2 of a blow molding tool for carrying out the method according to the invention. The blow mold half 2 has a baseplate 4. Arranged on the baseplate 4 is a distributor block 21 with two connections 211 and 212 for supplying a temperature control medium. A molding body 5 and a bottom part 10, which adjoins the molding body 5, are arranged on the base body 4. A headplate 7 is embedded in the molding body 5. The entirety consisting of molding body 5, bottom part 10 and headplate 7 provides a mold cavity 6. As part of the mold cavity 6, the molding body 5 has an inner wall 51. The inner wall 51 has two regions 511, wherein an associated section with separate temperature control channels 54 (see FIG. 3 in this respect) is assigned to each region 511. The temperature control channels 54 are connected to the connections 211 and 212 via the distributor block 21. The surfaces of the regions 511 each have a reflection grating.

FIG. 3 shows a vertical sectional view through one of the regions 511 of FIG. 2. From this sectional view, it can be seen that the region 511 is formed as part of the inner wall 51. The reflection grating is not shown in more detail for the sake of clarity. The region 511 has an associated section, on which a molding part 20 formed separately from the molding body 5 is formed. At its end facing the mold cavity 6, the molding part 20 is embedded in the molding body 5 and subsequently, in the direction of the baseplate 4, spaced apart from the molding body 5 with an insulating element 16. For better insulation, the insulating element 16 is additionally spaced apart from the molding body 5 by two O rings.

The temperature control channels 54 are formed within the molding part 20. To this end, a hole 541 is provided in the molding part 20 and a tube 542 opens into or penetrates through this hole 541 lengthwise so that an annular gap is formed between the tube 542 under the inner wall of the hole 541 through which the temperature control medium can be conducted into the vicinity of the region 511 or can be discharged therefrom. The tube 542 opens into a corresponding channel on the distributor block 521 and accordingly, the annular gap opens into a further channel on the distributor block 21. These channels open correspondingly into the connections 211 and 212 (see FIG. 2).

The cooling channel 54 has an extension at its end adjacent to the region 511 so that the cooling channel 54 forms a chamber. This chamber connects the ring gap and the tube so that a cooling circuit can be provided. The chamber is spaced from the mold cavity 6 with a wall thickness, which in the present case is 3 mm. This ensures that the heat that this wall thickness has, for example, after blow molding, can be dissipated quickly, or that the wall thickness can be rapidly heated with a suitable heating medium so that its temperature substantially corresponds to that of the preform that is introduced into the mold cavity 6 for blow molding.

FIG. 4 shows a blow mold half 2 of a blow molding tool 1 that is an alternative to FIG. 2 for carrying out the method according to the invention.

The blow mold half 2 in turn comprises a baseplate 4 and a molding body 5, in which a mold cavity 6 is formed. The mold cavity 6 defining half the shape of a container body is bounded by a shaping inner wall 51. The inner wall 51 is entirely designed as region 511 and is provided with a reflection grating not shown here. In contrast to the blow mold half shown in FIG. 2, the molding body 5 is embedded in an insulation block 16. The insulation block 16 consists of a thermally insulating plastic or plastic composite material and thermally insulates the molding body 5 from the baseplate 4, a frame 17 fastened thereto, a neck insert 18 which corresponds to the head plate 7 in FIG. 1, and the bottom part 10. The insulation block 16 prevents thermal bridges between the molding body 5 and the surrounding parts of the blow molding tool. According to the exemplary embodiment shown, the neck insert 18 is formed as a separate part which is brought into position when the blow mold halves are closed and lifted off again when they are opened. However, the neck insert 18 may also be fixedly connected to the frame 17.

FIG. 5 shows the molding body 5 according to FIG. 4. Said molding body is embedded in an insulation block 16. The mold cavity in turn bears reference sign 6. The inner wall delimiting the mold cavity 6 is provided with reference sign 51. The mold cavity 6 defines, for example, half of the shape of a container body. The inner wall 51 can be polished, for example, but in the present case has a reflection grating, which is not shown for the sake of better clarity. The molding body 5 is completely embedded in the insulation block 16 in order to ensure that no undesired thermal bridges to the baseplate 4 can occur. The molding body 5 is dimensioned, for example, in such a way that space remains in the insulation block 16 for a headplate or for a foot part for the production of the container neck or of the container bottom. In this way, the headplate and the foot part (not shown in each case) are also thermally insulated from the baseplate and the frame of the blow mold half, and possible thermal bridges can be prevented.

The shaping inner wall 51 has a shortest possible distance from a rear side 53 of the molding body 5. In other words, the molding body 5 has a wall thickness of about 1.5 mm to 12 mm in the region of the mold cavity 6. This ensures that the heat that this wall thickness has, for example, after blow molding, can be dissipated quickly, or that the wall thickness can be rapidly heated with a suitable heating medium so that its temperature substantially corresponds to that of the preform that is introduced into the mold cavity 6 for blow molding.

FIG. 6 shows a perspective view of the rear side 53 of the molding body 5 from FIG. 3. In the side of the molding body 5 facing away from the viewer, the mold cavity 6 is formed. The rear side 53 of the molding body 5 is provided with temperature control channels 54 for the throughflow of a heating medium/coolant, for example water. The temperature control channels 54 can be produced by machining, for example milling and drilling, the molding body 5. They are delimited from one another by ribs. In an alternative embodiment variant, the temperature control channels 54 can be produced during casting of the molding body or by alternative manufacturing methods, for example laser melting or metal printing. The rear side 53 of the molding body 5 with the temperature control channels 54 is embedded in the insulation block in the assembled state of the blow molding tool (FIG. 3). The insulation block serves not only to thermally insulate the molding body 5 from the remaining components of the blow mold half. In fact the insulation block is also equipped with channels and/or holes for the supply and discharge of the heating medium/coolant to the channels formed on the rear side of the molding body. It may be provided that all connections for the supply and discharge of hot and cold media are provided on the insulation block. The connections then have no thermal contact with the baseplate, for example, or other components of the blow molding tool.

Depending on the size of the mold cavity 6 in the molding body 5, two or more separate heating/cooling circuits can also be provided on the rear side 52 of the molding body 5. In the exemplary embodiment illustrated, a partition 55 divides the temperature control channels 54 into two heating/cooling circuits 56, 57. The individual heating/cooling circuits are formed as a meandering arrangement of channels. The provision of a plurality of heating/cooling circuits 56, 57 permits a faster introduction or displacement of the heating medium/coolant in order to heat or re-cool the molding body. The pressure of the heating/cooling medium is advantageously up to 15 bar. In connection with a plurality of heating/cooling circuits 56, 57, a very rapid heating or cooling of the molding body 5 is thereby made possible, which has an advantageous effect on the cycle times. Water is usually used as heating/cooling medium for the molding body 5. The heating medium/coolant flows in the closest possible proximity to the shaping inner wall 51, which delimits the mold cavity 6 and provides the region 511 here. The rear side 53 of the molding body 5 together with the temperature control channels 54 thus constitutes the section associated with the region. Due to the arrangement of the temperature control channels 54, the heat of the container wall abutting against the shaping inner wall 51 can be dissipated very well, in particular when cooling the molding body 5. The dissipation of the heat is additionally improved by the ribs forming the channels. In contrast to, for example, injection molding, the heat can only be dissipated on one side via the cooled shaping inner wall of the molding body during blow molding.

In the method for transferring a negative structure, in the present case a reflection grating, of a surface of an inner wall of a blow molding tool, which is described comprehensively across all figures, the region 511 of the mold cavity 6 of the molding body 5 of a first blow mold half 2 of the blow molding tool 1 is first heated to the range of the temperature of the preform by supplying a temperature control medium through separate temperature control channels 54. The preform is then introduced into the mold cavity 6. Subsequently, the blow molding tool 1 is closed and the plastic container is shaped by inflating the preform and by abutting the preform against the inner wall 51 of the mold cavity 6. After the shaping, the region is cooled at a rate of 5 K/s by feeding a coolant through the temperature control channels 54 and the plastic container is demolded when a specific cooling temperature is reached. Due to the high temperature of the region and the rapid cooling of the region after the plastic container has been inflated, the reflection grating can be transferred to the plastic container almost without modification.

The invention claimed is:

1. A method for transferring a negative structure of a surface of an inner wall (51) of a blow molding tool (1) to a surface of a plastic container, the method comprising the steps of:
   heating at least one region (511) of a mold cavity (6) of a molding body (5) of the blow molding tool (1) on which the negative structure is formed,
   introducing a preform into the mold cavity (6),
   closing the blow molding tool (1),
   shaping the plastic container by inflating the preform and abutting the preform against the inner wall (51) of the mold cavity (6),
   cooling the at least one region (511) by feeding a coolant through temperature control channels (54) which communicates with an exterior surface of the inner wall (51) of the mold cavity (6),
   within the mold body (5), insulating the control channels (54) from at least a portion of the molding body (5) in order to decrease a mass of the blow molding tool, which is to be heated and cooled, and reduce energy costs of the method, and
   demolding the plastic container.

2. The method according to claim 1, wherein the at least one region (511) comprises the entire mold cavity (6).

3. The method according to claim 1, wherein during the shaping of plastic containers, comprising substantially polyolefins, and the at least one region (511) is heated to a temperature of at least 212° F. (100° C.).

4. The method according to claim 1, wherein during cooling, the at least one region (511) is cooled at an average cooling rate of at least 5 K/s to a demolding temperature of 100° F. (60° C.) in a case of plastic containers consisting of substantially of polyolefins.

5. The method according to claim 1, wherein the preform comprises substantially a polyolefin and a heating medium is supplied at a temperature of between 248° F. to 392° F. (120° C. to 200° C.), and the cooling medium is supplied at a temperature of between 41° F. to 104° F. (5° C. to 40° C.).

6. The method according to claim 1, wherein the at least one region (511) is thermally insulated from both the molding body (5) and from a baseplate (4).

7. The method according to claim 1, wherein the at least one region (511) has, in an associated section of the molding body (5), separate temperature control channels (54) for controlling the temperature of the at least one region (511).

8. The method according to claim 1, wherein an insulating element (16) made of a thermally insulating material is arranged between the molding body (4) and a baseplate (5) of the blow mold half (2).

9. The method according to claim 1, wherein a wall thickness, between the temperature control channel (54) and the at least one region (511), is at least 0.059 inches (1.5 mm) and at most 0.472 inches (12 mm) thick.

10. The method according to claim 1, wherein the at least one region (511) has a uniformly structured surface as the negative structure.

11. The method according to claim 10, wherein the structured surface is designed as a reflection grating, having a grating constant of less than 0.000394 inches (10 µm), the structured surface is transferred to the surface of the plastic container by the method with a deviation of less than 0.0000394 inches (1 µm).

12. The method according to claim 1, wherein the blow molding tool comprises a baseplate (4) which supports a distributor block (21) having first and second connections (211 and 212) for supplying the temperature control medium, and the baseplate (4) is connected to the molding body (5), a bottom part (10) and a headplate (7).

13. The method according to claim 1, wherein the blow molding tool comprises a baseplate (4), a bottom part (10) and the molding body (5),
the molding body (5) is embedded in an insulation element (16) which comprises a thermally insulating plastic or plastic composite material that thermally insulates the molding body (5) from the baseplate (4), and the insulation block (16) prevents thermal bridges between the molding body (5) and the surrounding parts of the blow molding tool (1).

14. The method according to claim 1, wherein a molding part (20) is formed separately from the molding body (5),
the temperature control channels (54) are at least partially formed within the molding part (20), and
the temperature control channels (54) at least partially insulated from the molding body (5).

15. A plastic container made of a polyolefin produced according to the method according to claim 1, wherein the container has a surface that is structured at least in one region, and the structure of the surface deviates less than 0.0000394 inches (1 µm) from the negative structure of the blow mold corresponding to the container.

16. The plastic container according to claim 15, wherein the structured surface is designed as a reflection.

17. The method according to claim 2, wherein an insulating element (16), made of a thermally insulating material, is arranged between the molding body (4) and a baseplate (5) of a blow mold half (2).

18. The plastic container according to claim 16, wherein a grating constant of the reflection grating is less than 0.000394 inches (10 µm).

19. A method for transferring a negative structure of a surface of an inner wall (51) of a blow molding tool (1) to a surface of a plastic container, the method comprising the steps of:
heating at least one region (511) of a mold cavity (6) of a molding body (5) of the blow molding tool (1) on which the negative structure is formed,
introducing a preform into the mold cavity (6),
closing the blow molding tool (1),
forming the plastic container by inflating the preform and forcing the preform to expand and abut against the inner wall (51) of the mold cavity (6),
forming the inner wall (51) of the mold cavity (6) of the at least one region (511) to have a wall thickness of at least 0.059 inches (1.5 mm) and at most 0.472 inches (12 mm) to promote heating and cooling,
cooling the at least one region (511) by feeding a coolant, via temperature control channels (54) which communicate with an exterior surface of the inner wall (51) of the mold cavity (6) to facilitate at least one of heating and cooling of the exterior surface of the inner wall (51) of the mold cavity (6),
within the mold body (5), insulating at least a portion of the temperature control channels (54) from at least a portion of the molding body (5) in order to decrease a mass of the blow molding tool, which is to be heated and cooled during a molding cycle, and reduce associated energy costs of the method, and
removing the plastic container from the mold cavity.

\* \* \* \* \*